United States Patent Office 2,901,244
Patented Aug. 25, 1959

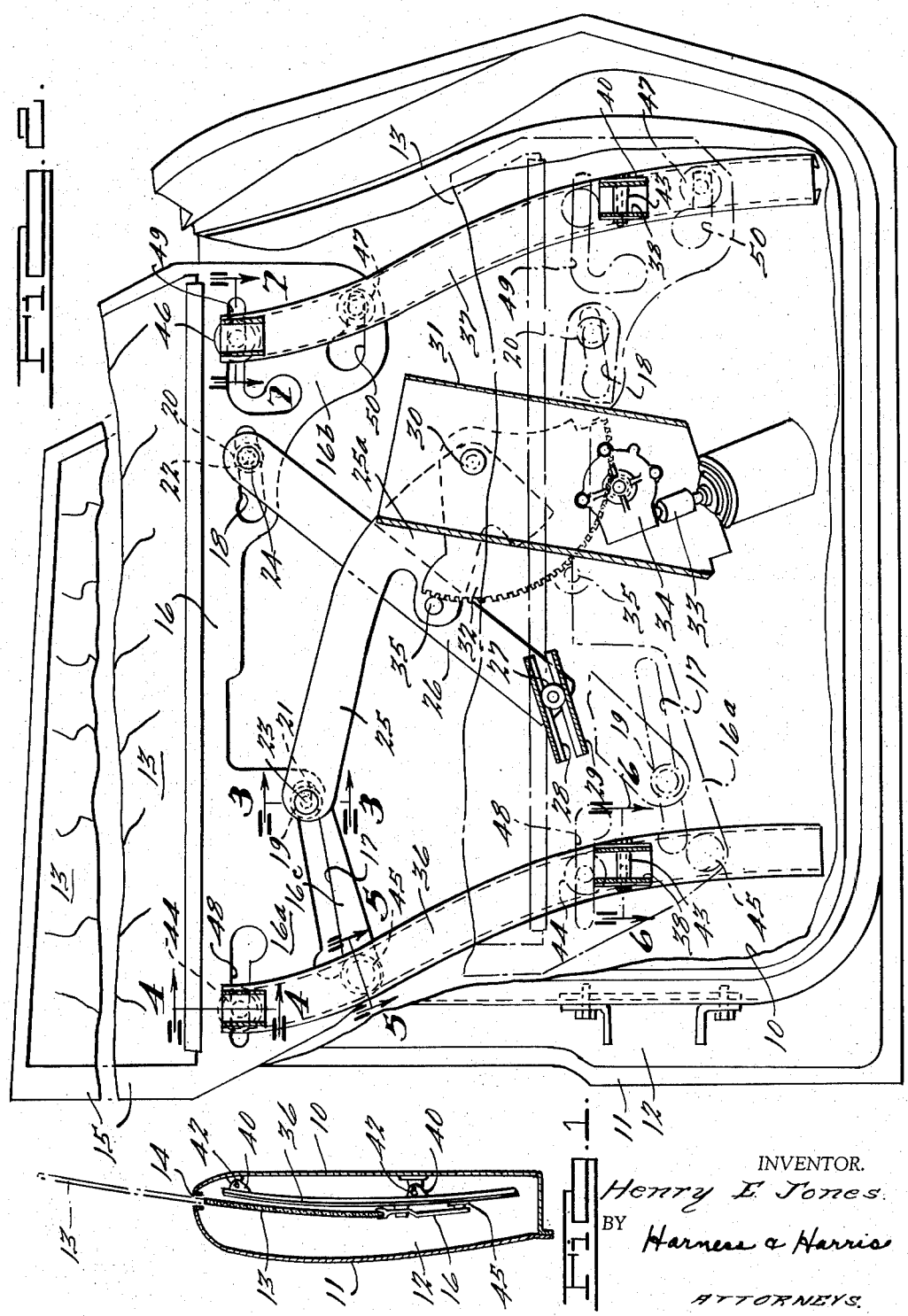

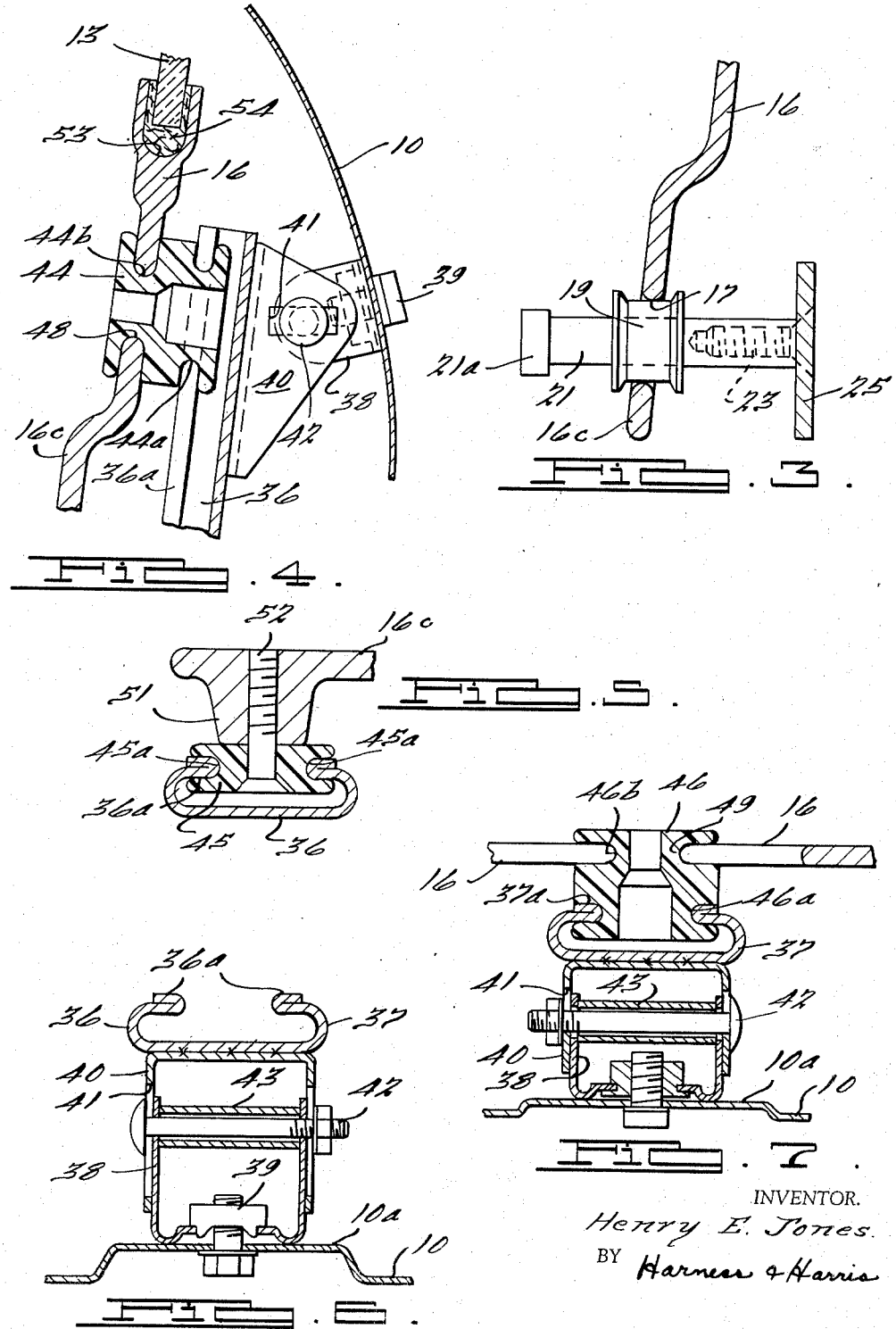

2,901,244

WINDOW REGULATOR

Henry E. Jones, Detroit, Mich., assignor to Chrysler Corporation, Highland Park, Mich., a corporation of Delaware Application October 28, 1957, Serial No. 692,817

11 Claims. (Cl. 268—124)

This invention relates to automobile window regulators adapted to raise and lower curved glass window panels.

Heretofore automobiles and other vehicles have customarily utilized plain glass window panels which could be readily raised and lowered vertically and which had at least one and usually both the front and rear edges of the panel supported within conventional glass run channels. Automotive designs now require the use of curved glass panels in door windows, windshields, and back lights in order to blend with body contours.

The more vertical lowering of a curved window panel into a window well in the vehicle body structure requires an upper opening in the well equal in width to the total depth of the arch of the panel, with consequent serious weather sealing problems. With the event of the 2-door and 4-door hard top automobile models with curved door-window panels, the geometry of the window regulating and supporting mechanism must be designed to render the panel unsupported above the vehicle belt line. In consequence additional support is required for the panel below the belt line in order to prevent undue transverse rocking of the panel in its raised position.

Important objects of the present invention are to provide an improved window panel supporting and regulating mechanism adapted to raise and lower a curved window panel through an opening in the window well no larger than the thickness of the glass, and wherein the window well need provide a space only wide enough to accommodate the window regulator or raising and lowering mechanism and the curvature of the window panel.

Another object is to provide an improved support and regulating mechanism for a vehicle window panel including arcuate guide tracks within the window well, whereby the curvature of the tracks preferably but not necessarily conform to the curvature of the window panel.

Another object is to provide a window panel supporting and regulating mechanism of the above character having improved guides or track followers which positively grip the lower portion of the window panel in rattle-free engagement and support the same for guided movement along the arcuate guide tracks with minimum frictional resistance.

Another and more specific object is to provide an improved vehicle body structure having a well for receiving a vertically curved adjustable window panel, the latter being provided with a base or footing of rigid material having depending portions within said well adjacent front and rear edges of the panel. Each depending portion of the footing carries a pair of vertically spaced guide followers comprising nylon rollers. The followers or rollers of each pair are provided with comparatively deep peripheral grooves adapted to receive snugly therein oppositely directed edge flanges of a curved and generally upright channel track, whereby each footing is supported fore and aft by two rollers adapted to ride in frictionally guided movement along their respective track as the window panel is raised or lowered.

The aforesaid edge flanges firmly engage the hub of each roller at the base of its grooves containing these flanges to support the rollers against fore and aft movement and also firmly engage the sides of the latter grooves to support the rollers firmly against transverse movement, thereby to minimize transverse rocking of the window panel when the latter is raised and is otherwise unsupported above the belt line.

The window regulator mechanism comprises a pair of crossed regulator arms pivotally connected between their ends and adapted to swing in an upright plane fixed with respect to the body structure so as to raise and lower the window panels. Confined in a pair of guide slots extending longitudinally of the vehicle in the two depending portions of the footing are a pair of riders mounted on the upper ends of the two regulator arms respectively to move transversely of the vehicle, thereby to accommodate movement of the window panel along the arcuate guide tracks upon swinging of the regulator arms in their aforesaid fixed plane.

Other objects of this invention will appear in the following description and appended claims, reference being had to the accompanying drawings forming a part of this specification wherein like reference characters designate corresponding parts in the several views.

Figure 1 is a transverse vertical sectional view through an automobile door showing a curved window glass panel in the lowered position;

Figure 2 is a fragmentary elevational view enlarged with respect to Figure 1 as seen from the inside of the vehicle body, portions of the inside door panel being broken away to show details of the window regulator and guide mechanism;

Figure 3 is a vertical transverse section through one of the spool riders and its guide slot, taken in the direction of the arrows substantially along the line 3—3 of Figure 2;

Figure 4 is a vertical transverse section through the upper follower and mounting for the forward guide track, taken in the direction of the arrows substantially along the line 4—4 of Figure 2;

Figure 5 is a transverse sectional view through the lower follower and mounting for the forward guide track, taken in the direction of the arrows substantially along the line 5—5 of Figure 2;

Figure 6 is a horizontal sectional view through the lower mounting for the forward guide track, taken in the direction of the arrows substantially along the line 6—6 of Figure 2; and Figure 7 is a horizontal sectional view through the upper follower and mounting for the rear guide track, taken in the direction of the arrows substantially along the line 7—7 of Figure 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to the drawings, an embodiment of the present invention is illustrated by way of example with a window regulator mechanism mounted within a door of a hard top convertible-type vehicle body. The door illustrated in Figure 1 comprises inner and outer panels 10 and 11 forming a well 12 therebetween for reception of a window glass panel 13 when the latter is in its lowered position, Figure 1. Opening upwardly from the well 12 is an opening 14 through which the panel 13 is raised to the phantom position illustrated.

In accordance with conventional construction, the panel 13 is supported along its forward, upper and rear edges by a channel frame 15 as for example of chrome plated steel. The lower edge of the panel 13 is supported by a footing 16 comprising a steel plate integrally connected with the frame 15. Adjacent the forward and rearward edges respectively of the panel 13 are forward and rearward depending base portions 16a and 16b of the footing 16.

The regulating mechanism for raising and lowering the footing 16 is secured thereto within guideways or slots 17 and 18, the slot 17 inclining rearwardly within the lower portion of the base 16a and being approximately twice the length of slot 18 which inclines rearwardly in the upper forward portion of the base 16b. Freely movable along the slots 17 and 18 respectively are flanged nylon spool riders 19 and 20, Figure 3, having inner and outer flanges confining opposite sides of the corresponding base portion 16a or 16b therebetween. The spools 19 and 20 are journalled on transverse shafts 21 and 22 respectively and are freely slidable thereon for transverse axial movement. The outer ends of the shafts 21 and 22 are enlarged as at 21a to limit outward axial movement of the spool riders and are secured at their rear ends by screws 23 and 24 to the upper ends of swinging regulator arms 25 and 16 respectively.

The lower end of arm 26 carries a nylon spool rider 27 engaged in a rearwardly inclined guide slot 28 in a bracket 29 which is suitably secured to the inner door panel 11, at a location between and substantially below the slots 17 and 18. The spool riders 20 and 27 are identical in construction and are assembled within their respective guide slots in the manner of spool rider 19, so that these former spool riders are not illustrated in detail. However, it will be apparent that rider 27 need not be mounted for axial movement with respect to arm 26 or bracket 29.

The lower end of arm 25 comprises an enlarged hub portion 25a pivoted at 30 on a bracket 31 which in turn is secured to the inner panel 10. The hub portion 25a is secured as by welding to a sector gear 32 which is operatively connected with the driveshaft 33 of an electric motor by means of a gear reduction mechanism 34, whereby the sector gear 32 is rotated in a fixed upright plane about the pivot 30 in accordance with the direction of operation of the motor driven shaft 33.

The swinging regulator arms 25 and 26 are pivotally connected between their ends at 35 at a location below the line of centers through spool 19 and pivot 30 such that the effective axes of arm 25 from pivot 30 to pivot 35 and from pivot 35 to spool 19 inclines generally forwardly when the window panel 13 is in its raised position, and arm 26 inclines upwardly from spool 27 to pivot 35 and thence to spool 20. When the window panel 13 is in its lowered position, the aforesaid effective axes of arm 25 decline forwardly and arm 26 declines rearwardly, phantom positions, Figure 2.

Spool 20 in the raised position is directly above the pivot 30 and swings to a lowered position below and rearwardly of the pivot 30, whereas both pivot 35 and spool 19 in their raised positions are located above and forwardly of pivot 30 and swing to lowered positions below and forwardly of the pivot 30. By virtue of the foregoing geometry, upon operation of motor 33 to swing sector gear 32 and arm 25 downwardly from the position shown in Figure 2, the pivotally connected arm 26 also swings downwardly. Spools 19 and 20 riding in their inclined guideways 17 and 18 draw panel 13 downwardly and rearwardly into well 12, as described below, while maintaining the footing 16 in a substantially horizontal position at all times.

Cooperating with the swinging movements of the regulator arms 25 and 26 and serving to guide the raising and lowering movements of footing 16 is a pair of outwardly opening upright channel-shaped guide tracks 36 and 37 having inturned side flanges 36a and 37a respectively and being curved vertically to conform substantially to the vertical curvature of the glass panel 13. The forward and rearward tracks 36 and 37 shown are formed substantially identically and are provided with slight S-curvatures to guide the footing 16 and panel 13 in a rearward as well as downward movement.

The upper and lower ends of both tracks 36 and 37 are adjustably supported in substantially the same manner as best illustrated in Figures 4, 6 and 7 wherein the attachment means for the upper and lower ends of track 36 and the attachment for the upper end of track 37 are shown. The attachment means for the upper and lower ends of both tracks have corresponding parts numbered identically in each, although the dimensions of the corresponding parts differ slightly in accordance with the geometry of the door. Thus as illustrated in Figure 6, an outwardly opening channel bracket 38 is secured at its base to a boss 10a of the inner door channel 10 by means of a nut and bolt assembly 39. Telescoped over the inner bracket 38 is an inwardly opening channel bracket 40 having transversely extending adjustment slots 41 in its opposite sides. A bolt and nut assembly 42 extending through the adjustment slots 41 and also through openings in the channel sides of the bracket 38 and through a tubular spacer 43 secure the brackets 38 and 40 together in a desired adjusted position. The bases of the guide tracks 36 and 37 are suitably secured as by spot welding to the bases of the corresponding channel brackets 40, whereby adjustment of the latter enables positioning of the tracks 36 and 37 to align the window panel 13 properly with the opening 14 at the upper portion of the well 12.

The footing extensions or bases 16a and 16b are supported on the tracks 36 and 37 respectively for guided movement therealong by means of a forward pair of vertically spaced rollers or track followers 44 and 45 and by a rear pair of vertically spaced rollers 46 and 47. The rollers 44, 46, and 47 are similar in construction, so that roller 47 is not illustrated in detail. Each of the rollers 44, 46, and 47 is formed with a circumferential inner groove, as illustrated at 44a and 46a, which snugly confine the corresponding inturned track flanges 36a and 37a therein. Also the rollers 44, 46, and 47 are each provided with comparatively deep outer peripheral grooves, as illustrated at 44b and 46b, which snugly confine the juxtaposed portions of the footing 16 therein at opposite edges of corresponding guideways or slots 48, 49, and 50.

In this regard, it is to be noted that the flanges 36a and 37a as well as the portions of the footing 16 within the outer grooves of the track followers extend closely to the bottoms of their associated grooves, so as to support the rollers 44, 46, and 47 against displacement transversely of their axes. Likewise the portions of the footing 16 closely engaging the side walls of the outer grooves in cooperation with the flanges 36a and 37a snugly engaging the side walls of the inner grooves firmly support the footing against transverse rocking movement.

Below the guideway 48, the footing extension 16a is offset outwardly at 16c, Figure 4, to provide for an inwardly directed boss 51, Figure 5, which has a flat inner surface abutting a flat outer surface of spool follower 45. The latter is journalled on the shank of a screw 52 which secures the follower 45 to the boss 51. The roller 45 is provided with only one peripheral groove 45a which corresponds to the inner grooves 44a and 46a and snugly confines the inbent track flanges 36a therein in the manner that these flanges are confined within the grooves 44a and 46a. By this construction, roller 45 maintains the footing 16 in a fixed position with respect to the track 36, whereas the guideways 48, 49, and 50 enable longitudinal positioning of the other track followers as required during the raising and lowering movement of the footing 16 and window panel 13.

As is customary, the window frame 15 comprises a channel which confines the forward, upper, and rearward edges of the glass panel 13. Similarly, the upper edge of the footing 16 is provided with a channel portion 53, Figure 4, which confines the lower edge of the panel 13. The glass material of the panel 13 is insulated from the metal of frame 15 and footing 16 by a suitable protective padding 54.

Slot 48 which carries the upper track follower 44 extends horizontally in the upper forward portion of footing extension 16a at a location above and forward of guideway 17, whereas follower 45 is secured to the lower portion of extension 16a directly under slot 48 and at a level below guideway 17. The slots 49 and 50 extend horizontally in the rear portion of footing extension 16a, slot 49 being substantially at the level of and rearward of guideway 18, whereas slot 50 is located in the lower portion of extension 16b directly under slot 49. Each of the slots is provided with an enlarged opening to facilitate assembly of the corresponding track follower therein. Likewise the slots or guideways 17 and 18 are provided with enlarged openings for assembly of the flanged spool riders 19 and 20 therein.

By virtue of the foregoing structure, each footing extension is firmly secured to and supported by two vertically spaced track followers or rollers which in turn ride along the tracks 36 and 37. The interengagement between the footings and track followers, in cooperation with the interengagement between the track followers and the tracks at vertically spaced locations, achieves a comparatively rigid window panel mounting which requires no support above the vehicle belt line, yet which really enables raising and lowering of the window panel 13.

Upon rotation of the motor driven shaft 33 in the proper direction to cause counterclockwise rotation of sector gear 32, regulator arm 25 and correspondingly regulator arm 26 will swing downwardly in a planar movement, causing the riders 19 and 20 to draw the footing 16 and window panel 13 downwardly. The curved tracks impart a rearward motion to the window panel as it moves downwardly, enabling the latter to glide readily and without cocking through the opening 14 and into the well 12, Figure 1. Likewise, as the track followers move along the vertical curvature of the tracks 36 and 37, which corresponds substantially to the curvature of the panel 13, the spool riders 19 and 20 shift axially along their respective shafts 21 and 22 to enable such movement with respect to the fixed plane of swinging movement of the regular arms 25 and 26. Upon reverse turning of shaft 33 and sector gear 32, the reverse of the lowering movement occurs and the window panel 13 will be elevated and shifted forwardly to the raised position, Figure 2.

It is to be noted that the S-curved tracks 36 and 37 in combination with the rollers 44, 46, and 47 in their respective slots 48, 49, and 50, and the roller 45 fixedly secured to the footing 16 enables adequate rearward movement of the window panel 13 with a door of minimum front to rear dimensions and accordingly achieves a window tracking movement for the hard top convertible automobile. Where the aforesaid front to rear door dimension is adequate and the locations of the door handle, locking mechanism, and other hardware do not interfere, straight tracks 36 and 37 arranged at a rearward decline can be employed and the slots 48, 49, and 50 can be avoided. In such a construction, however, in order to achieve the same amount of rearward movement for the window panel 13 at its intermediate region of downward travel as is achieved in Figure 2, the panel 13 at its fully lowered position will necessarily be displaced considerably to the rear of the position shown in Figure 2.

I claim:

1. In a vehicle body structure, a vertically curved window panel for said vehicle, a footing of rigid material secured to the lower edge of said panel, a well in said structure below said window for receiving said panel, operable regulator means mounted in said well and connected to said footing to raise and lower the same, means for guiding the movement of said footing comprising generally upright curved guide tracks mounted in said well, followers engaging said tracks to move therealong, each track comprising a channel opening toward said footing and having inturned flanged sidewalls, each follower being grooved to receive the inturned flanges of said sidewalls snugly therein for moving therealong in guided relation, one of said followers firmly engaging said footing to maintain the same in predetermined spatial relationship with respect to the associated track, the other followers having grooves therein to receive oppositely directed edge portions of lost motion slots in said footing, said edge portions firmly engaging the sides of said grooves to support said footing against relative lateral movement with respect to said followers and firmly engaging the bottoms of said grooves to support said footing against relative vertical movement with respect to said followers.

2. In a vehicle body structure, a vertically curved window panel for said vehicle, a footing of rigid material secured to the lower edge of said panel, a well in said structure below said window for receiving said panel, operable regulator means mounted in said well, rider means connecting said regulator means to said footing for raising and lowering the latter upon operation of said regulator means, means for guiding the movement of said footing comprising generally upright curved guide tracks mounted in said well, followers engaging said tracks to move therealong, each track comprising a channel opening toward said footing and having inturned flanged sidewalls, each follower being grooved to receive the inturned flanges of said sidewalls snugly therein for moving therealong in guided relation, one of said followers firmly engaging said footing to maintain the same in predetermined spatial relationship with respect to the associated track, the other followers having grooves therein to receive oppositely directed edge portions of lost motion slots in said footing, said edge portions firmly engaging the sides of said grooves to support said footing against relative lateral movement with respect to said followers and firmly engaging the bottoms of said grooves to support said footing against relative vertical movement with respect to said followers, said rider means being shiftable transversely with respect to said regulator means to accommodate said raising and lowering of said footing along said curved tracks.

3. In a vehicle body structure, a vertically curved window panel for said vehicle, a footing of rigid material secured to the lower edge of said panel, a well in said structure below said window for receiving said panel, operable regulator means mounted in said well and connected to said footing to raise and lower the same, means for guiding the movement of said footing comprising a pair of generally upright curved tracks mounted in said well at locations spaced longitudinally of said vehicle, a pair of vertically spaced track followers associated with each track to move therealong, each track comprising a channel opening toward said footing and having inturned flanged sidewalls, each follower being grooved to receive the inturned flanges of said sidewalls snugly therein for moving therealong in guided relation, one of said followers firmly engaging said footing to maintain the same in predetermined spatial relationship with respect to the associated track, the other followers having grooves therein to receive oppositely directed edge portions of lost motion slots in said footing, said edge portions firmly engaging the sides of said grooves to support said footing against relative lateral movement with respect to said followers and firmly engaging the bottoms of said grooves to support said footing against relative vertical movement with respect to said followers.

4. In a vehicle body structure, a vertically curved window panel for said vehicle, a footing of rigid material secured to the lower edge of said panel, a well in said structure below said window for receiving said panel, operable regulator means mounted in said well and having regulating portions shiftable vertically in a plane fixed with respect to said body structure, rider means connecting said regulating portions with said footing for raising and lowering the latter upon operation of said regulator means, means for guiding the movement of said footing comprising a pair of generally upright curved guide tracks mounted in said well at locations spaced longitudinally of said vehicle, a pair of vertically spaced track followers associated with each track to move therealong, each track comprising a channel opening toward said footing and having inturned flanged sidewalls, each follower being grooved to receive the inturned flanges of said sidewalls snugly therein for moving therealong in guided relation, one of said followers firmly engaging said footing to maintain the same in predetermined spatial relationship with respect to the associated track, the other followers having grooves therein to receive oppositely directed edge portions of lost motion slots in said footing, said edge portions firmly engaging the sides of said grooves to support said footing against relative lateral movement with respect to said followers and firmly engaging the bottoms of said grooves to support said footing against relative vertical movement with respect to said followers, said rider means being shiftable transversely with respect to said regulator means to accommodate said raising and lowering of said footing along said curved tracks.

5. In a vehicle body structure having a movable window panel, first and second linear guides disposed angularly with respect to each other and secured to said structure and panel respectively, and a guide follower of unitary structure having first and second portions engaged with said first and second guides respectively for guided movement therealong.

6. In a vehicle body structure having a movable window panel, linear guide means secured to said panel, other linear guide means secured to said structure and arranged angularly with respect to certain of the first named guide means, a plurality of guide followers, each comprising a unitary structure having first and second portions engaged with one of said first named and with one of said other guide means respectively for guided movement therealong, and a follower mounted at a fixed location with respect to said panel and engaged with one of said first named guide means for guided movement therealong.

7. In a vehicle body structure having a movable window panel, first and second linear guides disposed angularly with respect to each other and secured to said structure and panel respectively, and a guide follower having separate grooves confining therein respectively portions of said first and second guides for guided movement therealong.

8. In a vehicle body structure having a movable window panel, linear guide means secured to said panel, other linear guide means secured to said structure and arranged angularly with respect to certain of the first named guide means, a plurality of guide followers, each having separate grooves confining portions therein of one of said first named and one of said other guide means respectively for guided movement therealong, and a follower mounted at a fixed location with respect to said panel and engaged with one of said first named guide means for guided movement therealong.

9. In a vehicular body structure having a movable window panel, first and second linear guides disposed angularly with respect to each other and secured to said structure and panel respectively, each guide comprising rigid parallel spaced guide edges, and a follower roller having first and second annular grooves confining therein the spaced edges of said first and second guides respectively for supported and guided movement therealong.

10. In a vehicle body structure having a movable window panel, linear guide means secured to said panel, other linear guide means secured to said structure and arranged angularly with respect to certain of the first named guide means, each guide means comprising rigid parallel spaced guide edges, a plurality of follower rollers, each having a pair of annular grooves confining therein respectively the spaced edges of one of said first named and one of said other guide means for guided and supported movement therealong, and a follower roller journaled to rotate at a fixed position with respect to said panel and having an annular groove confining therein the spaced edges of one of said first named guide means for guided and supported movement therealong, thereby to maintain said panel in predetermined spatial relationship with respect to the latter guide means during guided movement of the panel.

11. In a vehicle body structure having a movable window panel, a first pair of curved linear guides mounted on said structure, another linear guide mounted on said panel and crossing one of said first pair of guides, a second pair of linear guides mounted on said panel and crossing the other of said first pair of guides, each of said guides having a pair of parallel spaced rigid guide edges for supporting and guiding a grooved guide follower therealong, a separate guide follower associated with each set of crossing guides, each guide follower having a grooved portion snugly confining therein the guide edges of the associated guide mounted on said structure and being movable along the latter guide in guided and supported relationship, each guide follower also having another grooved portion snugly confining therein the guide edges of the associated guide mounted on said panel and being movable along the latter guide in guided and supported relationship, thereby to support said panel on said structure for guided movement, and a guide follower mounted at a fixed location on said panel and having a grooved portion snugly confining therein the guide edges of said one of said first pair of guides, thereby to maintain said panel in predetermined spatial relationship with respect to the latter guide during guided movement of said panel.

References Cited in the file of this patent

UNITED STATES PATENTS

| | | |
|---|---|---|
| 2,324,145 | Floraday | July 13, 1943 |
| 2,775,479 | Balint et al. | Dec. 25, 1956 |
| 2,798,761 | Himka | July 9, 1957 |

UNITED STATES PATENT OFFICE

CERTIFICATE OF CORRECTION

Patent No. 2,901,244                                                                August 25, 1959

Henry E. Jones

It is hereby certified that error appears in the printed specification of the above numbered patent requiring correction and that the said Letters Patent should read as corrected below.

Column 1, line 25, for "more" read -- mere --; column 3, line 25, for "16" read -- 26 --; column 8, line 5, for "vehicular" read -- vehicle --.

Signed and sealed this 8th day of March 1960.

(SEAL)

Attest:

KARL H. AXLINE                                                 ROBERT C. WATSON
Attesting Officer                                             Commissioner of Patents